C. L. WILBER.
METHOD AND APPARATUS FOR BALANCING CRANK SHAFTS AND THE LIKE.
APPLICATION FILED FEB. 14, 1921.

1,428,620. Patented Sept. 12, 1922.

Inventor
Carl L. Wilber

By Whittemore Hulbert Whittemore
& Belknap
Attorneys

Patented Sept. 12, 1922.

1,428,620

UNITED STATES PATENT OFFICE.

CARL L. WILBER, OF DETROIT, MICHIGAN, ASSIGNOR TO THE JEFFERSON FORGE PRODUCTS CO., OF DETROIT, MICHIGAN, A CORPORATION OF MICHIGAN.

METHOD AND APPARATUS FOR BALANCING CRANK SHAFTS AND THE LIKE.

Application filed February 14, 1921. Serial No. 444,926.

*To all whom it may concern:*

Be it known that I, CARL L. WILBER, a citizen of the United States of America, residing at Detroit, in the county of Wayne and State of Michigan, have invented certain new and useful Improvements in Methods and Apparatus for Balancing Crank Shafts and the like, of which the following is a specification, reference being had therein to the accompanying drawings.

The invention relates to the method and apparatus for balancing crank shafts and has for its primary object the obtaining of a preliminary balance prior to any machining operation, which lessens the work and amount of material which must be removed in obtaining the final balance. In the present state of the art it is usual to first form center bearings in the opposite ends of the shaft, which are concentric with the end bearing portions of said shaft. It frequently happens that in the forging these end bearing portions are not concentric with the axis of balance of the forging and therefore after the machining of the shaft, the structure is far out of balance. With my improved method the center bearings are formed concentric to the axis of balance in the forging instead of being concentric with the bearing portions thereof, with the result that less work must be performed in the subsequent balancing operation.

To accomplish this purpose I preferably employ centering jigs which are attachable to the opposite end portions of the shaft and are adjustable into concentric relation with the balance axis of the shaft, said jigs also having true cylindrical surfaces for use in obtaining the initial balance. When said jigs are secured and properly positioned, center bearing forming tools are engaged therewith and center bearings formed in the opposite ends of the shaft. The jigs are then removed and the machining of the shaft is proceeded with, after which it may be balanced with less difficulty than by methods heretofore used.

Figure 1:
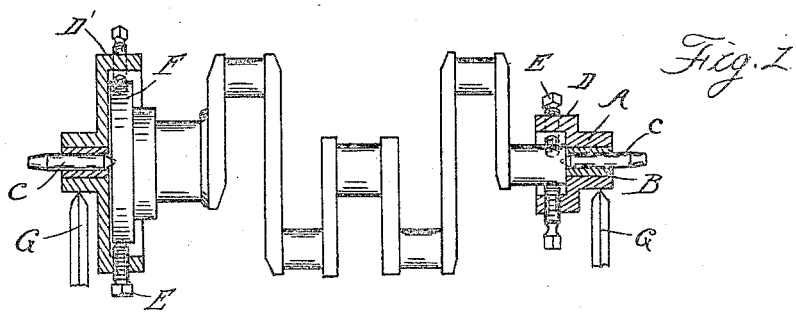
Figure 1 is a sectional elevation showing a crank shaft with the centering jigs applied thereto illustrating the manner of obtaining the initial balance.
Figures 2, 3:
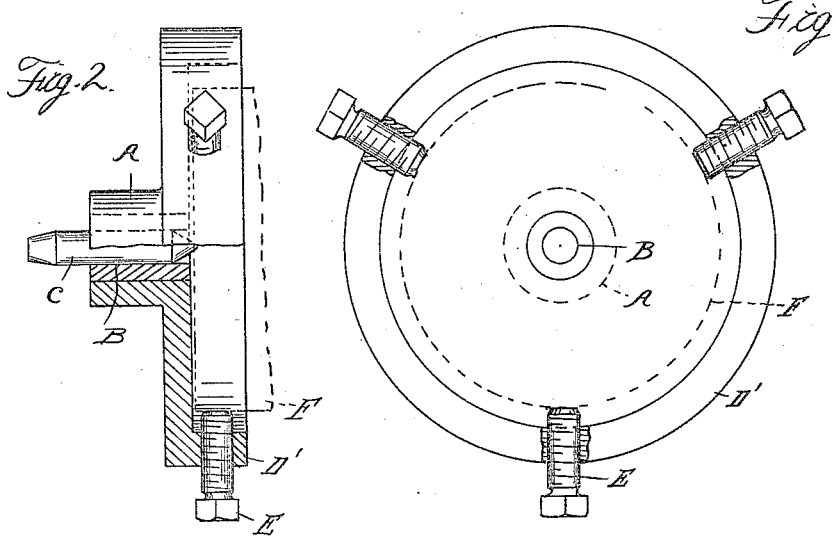
Figure 2 is a sectional side elevation and Figure 3 an end elevation of one of the centering jigs.
Figure 4:
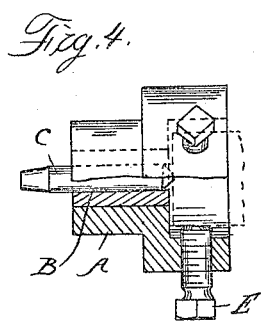
Figures 4 and 5 are similar views of the other of the centering jigs.
Figure 5:
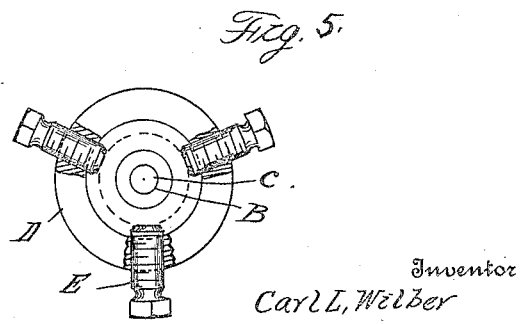

Each of these centering jigs is formed with a portion A having a cylindrical outer surface and a concentric bore B of a diameter to receive and form a guide for a center bearing forming tool such as C. The jigs are further provided with means for adjustably engaging the same with the ends of the shaft, preferably sleeve portions D, having set-screws E extending radially therethrough and equally spaced about the periphery. Where the shaft is formed with a flanged end such as F, the sleeve portion D' is enlarged in diameter to surround the periphery of this flange, as shown in Figures 2 and 3.

To obtain the initial balance, the jigs are secured to the opposite ends of the shaft by the clamping action of the set-screws E and the shaft is then placed with the cylindrical bearing surfaces of the jigs resting upon horizontal knife-edge bearings G. If the shaft is not in balance, the set-screws E are adjusted and this operation is repeated until the structure is in substantial balance. The center bearing forming tools C are then inserted in the guide bores B and center bearings are formed thereby in the ends of the shaft. The jigs are then removed and the machining of the shaft is proceeded with, the center bearings being used in the usual way. The machined shaft is finally rebalanced in the usual manner.

My improved method not only simplifies the operation of obtaining the final balance, but also lessens the amount of surplus stock that must be provided in the original forging in order to insure the cleaning up of all portions of the shaft when machined.

What I claim as my invention is:

1. The method of balancing crank shafts and the like, comprising the forming of center bearings in the opposite ends of said shaft concentric to the axis of balance in the rough forging, finishing the forging and rebalancing the finished structure.

2. The method of balancing crank shafts and the like, comprising applying to the opposite ends of said shaft members having true cylindrical surfaces, adjusting said members to arrange said true cylindrical surfaces concentric with the axis of balance in the rough forging and forming in the ends of the shaft center bearings concentric with said axis.

3. The method of balancing crank shafts and the like, comprising applying to the opposite ends of the shaft members having true cylindrical portions and sleeve portions for surrounding said shaft and spaced therefrom, adjusting said members radially to arrange the cylindrical portions thereof concentric with the axis of balance in the rough forging, forming center bearings in the ends of the shaft concentric with said cylindrical portions and removing said members and finishing the forging.

4. A device for balancing crank shafts and the like, comprising a member having a true cylindrical surface, means for engaging said member with the ends of the shaft and adjusting the same radially into concentric relation to the axis of balance in the rough forging, and a center bearing forming tool engageable with said member concentric to the cylindrical surface thereof for forming a center bearing in the end of the shaft.

5. A device for centering crank shafts and the like, comprising a member having an outer cylindrical portion and a sleeve portion for surrounding the end of the shaft, said screws passing radially through said sleeve portion and engageable with a shaft to adjust said cylindrical surface concentric with the axis of balance, said cylindrical surface forming a means for obtaining the balance, and center-forming means engageable with said member concentric to the cylindrical surface thereof for forming the bearing in the end of the shaft.

6. A device for centering crank shafts and the like, a member having a cylindrical outer surface, a bore concentric therewith and a sleeve portion for surrounding the end portion of the shaft, said screws spaced about said sleeve portion and extending radially therethrough into engagement with the shaft, and a center bearing forming tool engageable with said bore to be guided thereby in forming a center bearing in the end of the shaft.

7. A device for centering crank shafts and the like, the combination of a pair of centering jigs, each jig having a true outer cylindrical portion and a bore concentric to said cylindrical portion, sleeve portions extending inward from said jig to surround the end portions of the shaft, one of said sleeves being enlarged to receive the flanged end of the shaft, said screws arranged around said sleeve and extending radially therethrough into engagement with the periphery of said shaft and flange, and center bearing forming tools engageable with said bores and guided thereby.

In testimony whereof I affix my signature.

CARL L. WILBER.